US012124585B1

(12) United States Patent
Schneider et al.

(10) Patent No.: US 12,124,585 B1
(45) Date of Patent: Oct. 22, 2024

(54) RISK ASSESSMENT MANAGEMENT

(71) Applicant: O.I.J Orchestra Group LTD, Tel Aviv (IL)

(72) Inventors: Lior Schneider, Tel Aviv (IL); Dan Touitou, Ramat Gan (IL); Jacob P. Ukelson, Lehavim (IL)

(73) Assignee: Netformx, Tel-Aviv-Jaffa (IL)

( * ) Notice: Subject to any disclaimer, the term of this patent is extended or adjusted under 35 U.S.C. 154(b) by 94 days.

(21) Appl. No.: 17/452,230

(22) Filed: Oct. 25, 2021

(51) Int. Cl.
*G06F 21/00* (2013.01)
*G06F 21/57* (2013.01)

(52) U.S. Cl.
CPC ...... *G06F 21/577* (2013.01); *G06F 2221/034* (2013.01)

(58) Field of Classification Search
CPC .. G06F 21/577; G06F 2221/034; G06F 30/20; H04L 63/1433
See application file for complete search history.

(56) References Cited

U.S. PATENT DOCUMENTS

| | | | | |
|---|---|---|---|---|
| 6,051,029 | A * | 4/2000 | Paterson ................... G06F 8/38 703/22 |
| 8,272,061 | B1 * | 9/2012 | Lotem ................. H04L 63/1416 709/224 |
| 8,407,798 | B1 * | 3/2013 | Lotem ..................... G06F 21/55 726/21 |
| 9,537,884 | B1 * | 1/2017 | Raugas ............... H04L 63/1433 |
| 11,363,052 | B2 * | 6/2022 | Dani .................... H04L 63/1433 |
| 11,416,754 | B1 * | 8/2022 | Durvasula ................ G06N 3/08 |
| 2017/0046519 | A1 * | 2/2017 | Cam ........................ G06N 7/01 |
| 2018/0020018 | A1 * | 1/2018 | Walheim ............... G06F 21/577 |
| 2018/0048669 | A1 * | 2/2018 | Lokamathe .............. G06N 5/04 |
| 2018/0157831 | A1 * | 6/2018 | Abbaszadeh ......... G06F 21/552 |
| 2018/0159877 | A1 * | 6/2018 | Holzhauer ............ H04L 41/142 |
| 2018/0191758 | A1 * | 7/2018 | Abbaszadeh ....... H04L 63/1441 |
| 2018/0205755 | A1 * | 7/2018 | Kavi ..................... G06F 21/577 |
| 2019/0230099 | A1 * | 7/2019 | Mestha ............... H04L 63/1425 |
| 2019/0258953 | A1 * | 8/2019 | Lang ....................... G06N 3/08 |
| 2020/0137104 | A1 * | 4/2020 | Hassanzadeh ...... H04L 63/1433 |
| 2020/0177615 | A1 * | 6/2020 | Grabois ................. H04L 63/20 |
| 2020/0177616 | A1 * | 6/2020 | Hadar ................. H04L 63/1433 |
| 2020/0177618 | A1 * | 6/2020 | Hassanzadeh ........ G06F 21/552 |
| 2021/0014265 | A1 * | 1/2021 | Hadar ................... G06F 21/577 |
| 2021/0029137 | A1 * | 1/2021 | Wright .................... H04L 63/08 |
| 2021/0182385 | A1 * | 6/2021 | Roychowdhury ....... G06N 7/01 |
| 2021/0314341 | A1 * | 10/2021 | Moskovich ............. H04L 63/20 |

(Continued)

FOREIGN PATENT DOCUMENTS

| | | | | |
|---|---|---|---|---|
| WO | WO-2017133492 | A1 * | 8/2017 | ............. G06F 17/18 |
| WO | WO-2019222662 | A1 * | 11/2019 | ........... G06F 21/554 |

*Primary Examiner* — Don G Zhao

(74) *Attorney, Agent, or Firm* — Reches Patents

(57) ABSTRACT

There may be provided a method for model-based risk assessment of a computerized network, the method may include obtaining a model of the computerized network, the model comprises risk assessments building blocks that represent (a) risk related dependencies between members of sets of assets of the computerized network, and (b) probabilities of occurrence of the risk related dependencies; and simulating, for at least some of the assets of the computerized network, and based on at least a portion of the model, one or more attacks to provide one or more model-based risk assessment results.

28 Claims, 4 Drawing Sheets

(56) References Cited

U.S. PATENT DOCUMENTS

| | | | |
|---|---|---|---|
| 2021/0400063 A1* | 12/2021 | Tackabury | H04L 67/535 |
| 2022/0121884 A1* | 4/2022 | Zadeh | G06V 10/764 |
| 2022/0138753 A1* | 5/2022 | Wright | G06Q 20/4016 |
| | | | 705/44 |
| 2022/0166789 A1* | 5/2022 | Murray | H04L 63/20 |
| 2022/0210200 A1* | 6/2022 | Crabtree | G06F 16/951 |
| 2023/0076372 A1* | 3/2023 | Engelberg | H04L 63/1433 |
| 2023/0247045 A1* | 8/2023 | Zegeye | H04L 63/1416 |
| | | | 726/22 |

* cited by examiner

FIG. 2

Obtaining a model of the computerized network. The model includes risk assessments building blocks that represent (a) risk related dependencies between members of sets of assets of the computerized network, and (b) probabilities of occurrence of the risk related dependencies. 210

Simulating, for at least some of the assets of the computerized network, and based on at least a portion of the model, one or more attacks to provide one or more model-based risk assessment results. 220

200

RISK ASSESSMENT MANAGEMENT

BACKGROUND

There is a growing need to assess risk of computerized systems—especially large computerized systems that may include many computers.

SUMMARY

There may be provided systems, methods, and computer readable medium as illustrated in the specification.

BRIEF DESCRIPTION OF THE DRAWINGS

The embodiments of the disclosure will be understood and appreciated more fully from the following detailed description, taken in conjunction with the drawings in which:

FIG. 2 illustrates an example of a method.

DETAILED DESCRIPTION OF THE DRAWINGS

Figure 1:
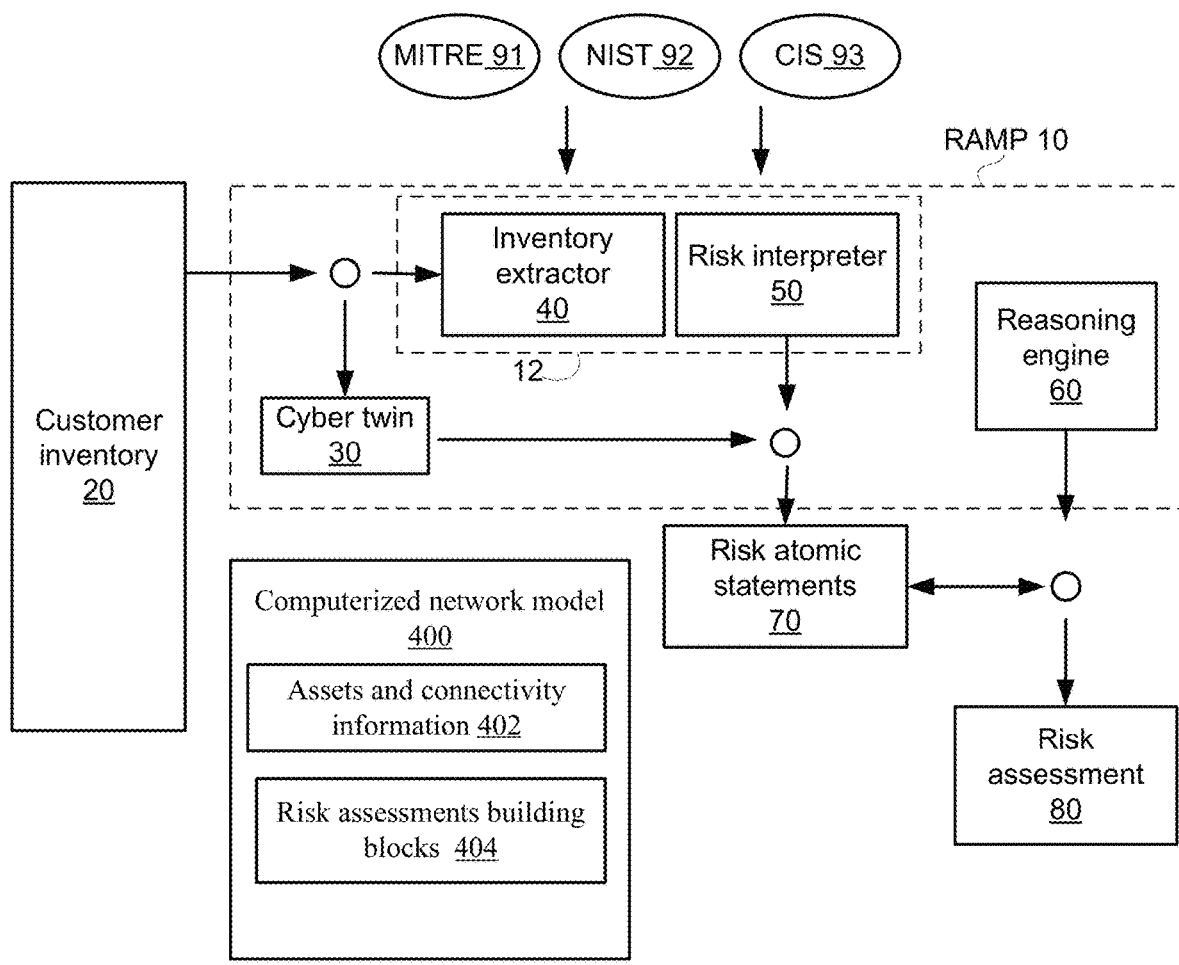
FIG. 1 illustrates an example of a system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions. The non-transitory computer readable medium may be executed, for example, by one or more routers of the NOC.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a risk assessment management platform (RAMP) that allows its users to get a precise and explainable evaluation of the risk associated with each critical asset in the organization and provide remediation impact estimation prior to its implementation.

The RAMP may exhibit at least one of the following:
  a. Contextual: evaluates risk associated with a given asset not from the asset's inherent vulnerabilities, but rather on the ability of an attacker to launch a campaign that compromise the asset. For example an asset may not be patchable for business reasons but may be high risk.
  b. Inclusive: takes into consideration all the controls, mitigations, policies, and security procedures that are already deployed as well as their weaknesses and provides a precise evaluation of residual risks. This additional layer of accuracy enables the customer to better prioritize the required remediations to vulnerabilities found.
  c. Explainable—provides supportive evidence to any result/conclusion/recommendation provided.
  d. Transparent and flexible—constructs and uses a cyber twin for minimal impact on the business and to enable what-if investigations
  e. Actionable—provides a set of potential remediation and the risk impact that this action will contribute
  f. Scalable—the platform isn't limited by the size of an organization's network
  g. Risk centric RAMP provides a risk-based decision support system that can answer questions such as:
  a. A new severe vulnerability has been published. How does it affect my security risk?
  b. The admin in charge of the FW configuration is leaving the company. Is it secure to appoint some other admin to take his responsibility for a while?
  c. SolarWinds's campaign has made me paranoid about zero-days. Are there additional similar pivotal assets in my organization that require attention?
  d. Over the years my company has accumulated a vast amount of protection technologies Do we really need all of them?

e. What will be the most beneficial mitigation to implement in my network f. What is the riskiest issue in my network?

g. How changing a configuration file will affect my network security risk?

FIG. 1 is an example of the RAMP and its environment. FIG. 1 also illustrates an example of a computerized network model 400 that may include assets and connectivity information 402 and risk assessment building blocks 404. Asset based hypotheses may be part of the model. The computerized network model 400 may be stored or be accessible to the cyber twin 30—which may store more than a single model.

RAMP 10 may include three main components: knowledge base, cyber twin 30 and the reasoning engine 60. Roughly speaking, the role of the knowledge base is to express the impact cyber related phenomena have on the organization.

The knowledge based is constructed by applying a process that may include transforming textual, natural language-based sources through automated algorithms. This may also be done, at least in part, manually.

The process may provide at least some of the following cyber information:

a. A description of the inventory information that is relevant to a cyber related phenomenon and how this information can be extracted from the customer environment.

b. A model of existing threats, techniques and vulnerabilities describing what are the preconditions needed for each vulnerability to be relevant for a given asset, a procedure to obtain the vulnerability data from the asset and an exact description of the consequences of exploiting vulnerability (e.g. privileged escalation, lost credentials, lateral movement). The process takes each technique and analyzes it to extract the pre-condition required for an attacker to be able to apply the technique to a specific asset. The process then creates the appropriate scripts that can actually extract the relevant data from the asset. The process also defines the consequences (i.e. the result an attacker will achieve) if they leverage the technique on that specific asset (for example they will have retrieved credentials).

c. Categorization of vulnerabilities and linkages between vulnerabilities, between vulnerabilities and their source, between vulnerabilities and asset attributes (for example ports relevant for an application). This information enriches the data from the techniques. For example if the technique is applicable to a specific application asset type, this maps to the specific ports relevant to that application. This may make the technique pre-condition more exact and lowers the chance for false positive. As the process can gather more exact information results will be tighter (with fewer false positives). The process may also link this information to relevant mitigations and from there to relevant protective policies.

d. A set of formal rules that when applied on the extracted information evaluates the probability that the phenomenon would manifest in the user environment. The process may also predict the impact. The process may provide a translation from security-oriented risks (the probability that things will get hacked cross their importance) into value-oriented risk (the loss in $$ that the organization will take).

This information can exists in various levels of detail and all additional detail enhances the fidelity of the cyber twin that results from application of the knowledgebase to the actual customer environment.

For example, the knowledge base may provide a rule which according to the data collected on the web browsing applications deployed in the organization, and the existence (or lack) of URL filtering solutions in the network, evaluates the probability a phishing attack might be successful on a specific desktop.

This automated knowledge base 12 has two components such as inventory extractor 40 and risk interpreter 50.

The inventory extractor 40 may include a set of scripts, programs, commands, and requests that should be applied on the customer inventory to extract all the risk related relevant information including access and connectivity information. In addition or instead of just extracting CVE vulnerability information based on known CVE databases)—the inventory extractor may extract any type of risk related evidence as defined in a much broader set of techniques, for example configuration information, logging information and other.

One set of techniques used by the inventory extractor may include translating into indicators of risk is sourced from data sources such as the mitre att&ck framework (denoted MITRE 91 in FIG. 1). The RAMP may use the information in the knowledge base as described above to find evidence of a wide variety of indicators of risk.

This information is stored in the cyber twin 30. The cyber twin can be perceived as a cyber oriented virtual projection of the real customer environment. It usually includes information about devices, operating systems, services, application, domains, accounts, configurations etc. It also contains information about vulnerabilities, weaknesses and bad configurations that can be found on all the discovered entities. It also contains information about connectivity and communication (both dynamic and static) between assets, and their hierarchy. Static connectivity can be obtained by configuration analysis of routers, switches, virtual interfaces, containers' and any other configurations that influence the data flows between assets in the organization. It can then be validated (by one or more process) as needed through active testing of the actual connectivity between assets. Dynamic connectivity information can be also obtained by "listening" to the actual network data flow between assets. The RAMP may take into account risks specific to each asset—and also takes into account the risks associated with exposures between assets. This capability enables "what if" scenarios of how potential risk on asset an increases the risks for asset B.

This cyber twin may support at least some of the following features:

a. Enables efficient querying mechanism that doesn't overload the organization's network and resources.

b. Provides the ability to explore what-if scenarios without the need to change anything on the organizational network.

c. Provides validation mechanism for mitigations that were already been implemented.

The risk interpreter which includes a set of formal rules that get as input the information in the cyber twin and evaluates the probability of an atomic risk statement to be valid. Atomic risk statements are simple declarations that partially link the risk associated among assets.

An example of such a rule can be: "If the administrator credentials on a device A are still set on factory default and another device B can connect over telnet with device A then administrator permissions on device A are exposed to device B with probability 100%".

According to this rule, if a device is found in the inventory with factory administrator default credentials, the risk associated with the administrator privileges on that device depends directly on the risk associated with any other device that can communicate with it.

Atomic risk statements express the most basic risk-based dependencies among assets. Ramp frameworks uses two classes of atomic statements—exposures and protections. An exposure statement is of the form:
  a. Exposure (source assets, target asset, justification, exposure probability)—meaning is that if all the source assets are compromised then the target asset will be compromised with probability exposure probability. (The justification is stated for reference only.)
  b. Protection (source assets, target asset, justification, protection probability, protecting asset)—meaning that the protecting asset, if operating correctly, will neutralize any exposure of the form Exposure (source, assets, target asset, justification, exposure probability) with probability protection probability.

Protections statements and most of the exposure statements are created by the risk interpreter. As elaborated later, during risk evaluation the reasoning engine might also generate additional exposure statements.

Risk Evaluation

The purpose of the risk evaluation is to evaluate for every asset in the organization the probability that the asset can be compromised. This can done in by executing evaluation rounds—for example of Monte Carlo simulations.

In every round and for every atomic statement a decision is made regarding the statement participation in that round. This decision is made by tossing a coin with probability equivalent to the statement's probability. In every round, based on the participating statements a decision is made for every asset whether it is secure or not. After a big enough number of such rounds the percentage of round in which an asset is found to be insecure is the probability that the asset can be compromised.

Round Assessment

Given an inventory some assets are inherently untrusted and are viewed to be compromised/insecure in every round. For example, an organization providing web services, would probably consider all customers devices accessing the web service to be untrusted. In every round, we calculate for each asset if it is insecure in the following way:
  a. Given a round and an exposure statement that participates in the round, we say that the exposure is applicable if it has no protection statements participating in the round or,
  b. If it has protecting statements but all the protecting assets in those statements are found to be insecure in the round.
  c. If an exposure is applicable in a round, and all the source assets are insecure in that round, then the target asset is insecure in the round as well.

From the above definition, one can see how RAMP, when evaluating risk, takes into consideration not only the protection technologies deployed but also the vulnerabilities that might prevent from such a protection to perform correctly. In fact, RAMP extends that even further when analyzing the impact that a compromised network device might have on the organization's risk: an insecure router or firewall can allow malicious traffic to pass through (Rogue connectivity and reachability vs. standard connectivity and reachability), increasing the connectivity in the network which will initiate one or more risk interpreter rules and potentially generate more exposure statements.

Evaluation Model

RAMP may not set a hierarchy between interpreter rules, atomic statements, and asset insecurity. An interpreter rule might generate an atomic statement that might cause a device to be insecure which in its turn initiate an interpreter rule and so on. For that reason, the RAMP adopts a "fix point" approach when evaluating security: the reasoning engine constantly attempts to create new facts from the already derived facts on the existing rule until a fixed point is reached and no new facts can be derived.

Risk Based Insights.

In addition to the assessment of the assets' risk, Ramp provides additional meaningful insights on risk related issues such as (but not limited to) pivotal assets, mitigations and risk oriented policies.

Pivotal assets—these are assets that even though they currently have relatively low risk, will potentially increase the organizational risk considerably if they become compromised due to some reason e.g. admin error, zero-day etc . . . . Because of that, pivotal assets require additional layers of protection and consequently must be detected and classified early in the risk assessment process. A straightforward but inefficient solution to detect pivotal assets would be that for every asset to syntactically set it untrusted, recalculate the organization risk, compare it to the original risk and take the change as pivotal score. Instead, during every risk evaluation round, RAMP calculates for every asset if there exists and "infection path" between the asset and an uncompromised crown jewel asset. Such a path witnesses that if the asset would turn insecure this would affect the crown jewel asset security. The pivotal score of an asset is the average number, over the round, crown jewels assets affected.

Mitigations—RAMP provides recommendations on the most efficient/cost effective way to reduce the organizational risk. That is done by offering a set of possible mitigation to the existing risk dependencies. Each mitigation has a score that represents the impact implementing the mitigation has on the organizational risk. RAMP also offers cost effective answers to question such as "what is the lowest cost set of mitigation that can reduce the organizational risk to X"

Risk oriented policies—RAMP facilitates the implementation of risk based organizational policies. Patching is an example where associating risk with the patching policy provides better prioritization of the IT efforts. Indeed, most if not all organization have a requirement to remediate to software vulnerabilities within an amount of time which is a function of the asset location and/or severity of the vulnerability. RAMP provides a more effective prioritization by ranking the remediation task required according to their impact on the organization risk.

The Framework Translation Process

The mentioned above process may analyze known security subjects such as MITRE ATT&CK technique, actual campaign analysis or CIS control guide that can be either attacking technique or mitigation method (which are unstructured data). The analysis result is the translation of its cause and effect into pre and post conditions. Meaning that for every security subject the process deducts the most accurate pre-conditions that must apply, under the different possible environments, for the security subject to be applicable and the most accurate effect that this security subject will cause, again, under the different possible environments. This translation in turn will provide the requirements for two important phases:

The inventory extraction—based on the pre and post conditions for a security subject, the process may extract very specific inventory information to determine the applicability of the pre-condition and the effect that the post-condition will have.

For example, the process may provide a tailor-made solution per different OS and OS architecture as well as existing tools that already extract the data that we are interesting in. This phase includes all the data that we extract for the "Cyber Twin" that we will run all our algorithms on, including but not limited to:
a. Accounts
b. Application
c. Operating systems
d. Configuration files
e. DBs
f. Open ports
g. Ip tables and ACL rules
h Registry data
i. Cached data
j. Logging information
k. Running services Atomic statement development—the pre and post conditions along with the inventory requirements will define the atomic exposure sentences that in turn will build network of exposures that in the future will be translated into calculation of attack scenarios e.g. attack trees, attack graphs, risk calculation and basically every other algorithm that we would like to run on top of the "cyber twin" inventory.

For example, we can take a very well known technique named "Pass the hash". A very short description is that an adversary can use hash token that he somehow obtained in order to authenticate as a user without having the real security token (such as password). More can be found in the following link: https://attack.mitre.org/techniques/T1550/002/

As a first step we translate the cause and effect into pre and post condition under different environments variables:
Pre-conditions: There must be a compromised host (in the control of an adversary). The compromised host must have connectivity (the ability to communicate under the desired port and protocol) to the target.
Now we have multiple cases where this technique can be applicable. There is "Or" condition between the cases and "And" condition for each case with the other pre conditions:
First Case—Domain Authentication
Domain account username is known—without username, adversary can't authenticate using the pass the hash technique.
Domain account NTLM hash is known—without the NTLM hash, adversary can't authenticate using the pass the hash technique.
Domain account has privilege to target—if the account doesn't have privileges on target, the authentication will be denied.
Second Case—Local Authentication
Local account username is known—without username, adversary can't authenticate using the pass the hash technique.
Local account NTLM hash is known—without the NTLM hash, adversary can't authenticate using the pass the hash technique.
The post condition can be one of the following, depends on the environment (the specific inventory that exist):
Compromised account privilege to target host—with regards to the account privileges, now an adversary will have the same privileges on the target
Compromised limited account privilege to host—this is due to specific configuration flag named: LocalAccountTokenFilterPolicy
There may be a distinction between the two post-conditions according to the relevant configuration data from within the specific inventory.

After translating the technique into pre and post conditions, we can define the data that we need to extract to determine the applicability of this technique:
These requirements will be translated into extraction commands on the specific inventory and into atomic statements.

For a minimum amount of techniques (as shown in the example) we can build the APSs where a technique post-condition concatenated as different technique pre-condition (with the correct probability).

Extraction PowerShell Commands:
Going through this example we defined 5 PowerShell scripts (in addition to network connectivity data and analysis):
a. Services.ps1—this script provides, per Windows based host, a List of listening services, their ports and the process/service name using them. This is part of our connectivity analysis for this technique
b. DomainPrivileges.ps1—this script provides list of domain users, their groups and the privileges they have under the domain. This is part of the post-condition effect, which permissions will be applied after exploiting this technique.
c. LocalPrivileges.ps1—exactly the same as for domain case, only local.
DomainGroups.ps1—this script provides, per Windows based host, List of Domain Hosts and their groups.
LocalAccountTokenFilterPolicy.ps1—this script provides the registry value for this flag.

Creating atomic facts. The goal of the risk interpreter is to transform the security posture of the organization into atomic facts that can be processed by the reasoning engine. The main type of atomic facts are exposures. An exposure atomic fact reflects a potential security dependency between assets. For example, following the evaluation of the feasibility of the pass the hash technique on the cyber twin might generate the following statement:
exposure (sources=[Bob_account_name, Bob_NTLM_hash, Chrome_192.10.11.12], target=System_priviledge_192.22.34.107, reason=Technique_pass_the_hash, probability=67%)
Which states that if Bob's account name is known, and the NTLM hash of Bob is disclosed then an attacker controlling the Chrome application on server with IP 192.10.11.12 will be able to gain system privileges on server with IP 192.22.34.107 with a 67% probability. Such exposure statement is automatically created when applying of the pass_the_hash risk interpreter rule on the cyber twin.

Risk interpreter rules are logical rules that express the logical conditions required in the cyber twin in order for an atomic statement to be applicable. Risk interpreter rules are expressed in Datalog. For example, the—high-level—rule that generates atomic statements of the above type is:
exposure (sources=[username, hash, asset], target=priviledge, probability=severity) ←
account_username (account, username), account_NTLM_hash (account, h ash), account_priviledge (account, target_host, priviledge), login_service (target_host, service), executable_asset (source_hos t, asset), connected (source_asset, target_asset, service)

This rule states that if there is
a. a user account whose name is username and whose hash is hash, and this account has a privilege on a given host target_host and
b. target_host enables remote login and there exists
c. some executable asset on another host source_host and source host can access target_host over the login service, then if username, hash and the asset would be compromised then privilege will be compromised too.

All the data in the relations used in the rule precondition is collected from the cyber twin.

Contextual Risk Evaluation Monte-Carlo Simulations:

Given some asset, the probability that an asset can be compromised is calculated by executing Monte-Carlo simulations. In each such simulation a subset of the exposure statements is chosen randomly based on the exposures' probabilities and for every asset a decision is made whether the asset can be compromised in this specific simulation. The decision algorithm is the following: assume that expo is an exposure which participates in the current simulation, if all the source assets in the exposure are compromised in the simulation, then the target asset is compromised as well. In such case we say that the exposure statement has been applied. When all the simulations are completed, the compromise probability for an asset is set to be the percentage of simulations in which the asset is compromised.

Untrusted assets are either partially or totally out of the organization control and are therefore assumed compromised in all the simulations. An untrusted asset can be an external user of one of the organization's web services or an application running in the DMZ area. The range of untrusted assets is defined by the user according to their risk appetite.

Inclusive Risk Assessment

In our model protections, controls, and organizational policies that aim (or fail) to mitigate attacks are expressed in two possible forms: protection statements, and cyber twin volatile facts (ctvf). A protection statement expresses the fact that some protecting asset is preventing a target asset from being exposed to a source asset due to some vulnerability (reason). An example of a protection statement could be:

Protection (source=External_ip, target=Web_server_192.10.18.11, CVE_2020_1472_RCE, 70%, WAF_192.10.18.2)

Which states that WAF_192.10.18.2 prevents with 70% success from External_ip to compromise Web_server_192.10.18.11 using vulnerability CVE_2020_1472.

Here is another example:

Protection (source=Application_192.10.18.11, target=OS_192.10.18.11, CVE_XXXX_PCE, 50%, Patch_manager_192.10.18.11)

Which states that the patch manager installed on machine 192.10.18.11, by upgrading the OS to a newer version, prevents an application from using a privilege escalation vulnerability the original OS suffers from. In this case, the protection probability is calculated from the patch manager policy configuration. Similarly, as with exposure statements, protection statements are generated by the risk interpreter based on the information kept in the cyber twin.

Protection statements impact the risk assessment in the following way: in every simulation a subset of the protection statements is randomly chosen based on the statement's probabilities.

During a simulation, an exposure statement is said to be "applicable" if it either has no protection statements or all its protection statement are fulfilled with compromised protecting assets.

In other words, an exposure is applicable if all its protection are compromised and therefore fail to mitigate the exposure.

Assuming the existence of protection statements, the decision algorithm is now updated to: assume that expo is an exposure which participates for the current simulation, if the exposure is applicable in the simulation and if all the source assets in the exposure are compromised in the simulation, then the target asset is compromised as well. As mentioned, another option to express the impact protecting measures might have on the risk assessment is through cyber twin volatile facts. Ctvf are temporary updates to the cyber twin which are the result of a compromised protective measure failing to provide the expected protection. Cvtf are used for example to express how compromised network devices fail to currently segment the network and consequently exposing assets to new attacks.

The following rule in the risk interpreter:

Routable (packet, source, destination)←Routable (packet, source, device), Routable (packet, device, destination), Compromised (device)

states that a compromised network device—router, firewall etc. . . . ) if compromised may allow traffic to go through it regardless of its configuration. This models the fact that a compromised network device might increases the connectivity in the organization which might potentially create new exposure atomic statements that will increase the compromise probability of the organization assets (including additional network devices which in their turn will increase connectivity and so on)

Explainability

Unlike machine learning based approaches, our system evaluates risk based on simple atomic facts that are created from understandable risk rules being applied on the organization infrastructure. One possible approach to illustrate to the user the evaluated risk is with Attack Path Scenarios (APSs). An attack path scenario, is a sequence of events which conclude in one of the significant assets of the organization being compromised where each event is the result of an applied exposure statement. Every APS has a score which represent the likelihood of such scenario to occur based on the exposure statement probabilities. RAMP calculates and presents the user with the highest score APS.

FIG. 2 illustrates method 200 for model-based risk assessment of a computerized network.

Method 200 may start by step 210 of obtaining a model of the computerized network.

The model includes risk assessments building blocks that represent (a) risk related dependencies between members of sets of assets of the computerized network, and (b) probabilities of occurrence of the risk related dependencies.

Step 210 may be followed by step 220 of simulating, for at least some of the assets of the computerized network, and based on at least a portion of the model, one or more attacks to provide one or more model-based risk assessment results.

A model-based risk assessment result may indicate risks associated with one or more network assets, solutions to the one or more risks, and the like. Examples of such results may include, risk based insights, pivotal assets, mitigations, risk oriented policies, untrusted assets, and the like.

Examples of the simulation are provided in the sections titled "risk evaluation", "round assessment (iterative implementation of step 220), and "contextual risk evaluation".

Step 220 may be executed by the cyber twin of the computerized network. Step 220 may be executed by systems that differ from the cyber twin.

An example of a risk assessment building block is a risk atomic statement. This is a non-limiting example.

The risk assessments building blocks include building blocks related to at least some of the sets of the assets.

An example of an exposure building block relates to a set of assets describes one or more source asset of the set, a target asset of the set, and an exposure probability.

The exposure building block related to the set of assets is calculated based on one or more asset based hypotheses, wherein an asset based hypothesis describes a pre-requisite for an exposure of the asset, a probability of occurrence of the pre-requisite and a result of the exposure of the asset. The pre-requisite may also be referred to as a pre-condition and the result may be referred to as a post condition.

An asset may be associated with different asset based hypotheses that differ from each other by at least the pre-requisite.

The exposure probability of an asset is calculated based on an assumption that each one of the one or more source assets of the set is compromised—which is only an example of a calculation of the exposure probability. This assumption is an example of an atomic risk statement.

The risk assessments building blocks may include protection building blocks related to one or more sets of the assets.

A protection building block may be related to a set of assets describes one or more source assets of the set, a target asset of the set, and a protection probability.

The risk assessment building blocks may include both (i) exposure building blocks related to one or more sets of the assets, and (ii) protection building blocks related to one or more sets of the assets.

Step 220 may be iterative and may include multiple simulation rounds. The iteration may allow to scan the network—and progress along network paths.

At least some of the simulation rounds may include estimating which risk assessments building blocks are relevant.

The risk assessment building blocks may be calculated based on asset based hypotheses.

The asset based hypotheses may be generated based on externally available information such one or more sources out of a threat intelligence (e.g. Mitre ATT&CK), compliance information (e.g. DoD STIGs—Department of Defense Security Technical Implementation Guides), vulnerabilities (NVD CVE) combined with organization specific information (discovered or calculated) such as connectivity between assets and attack scenarios.

Figure 3:
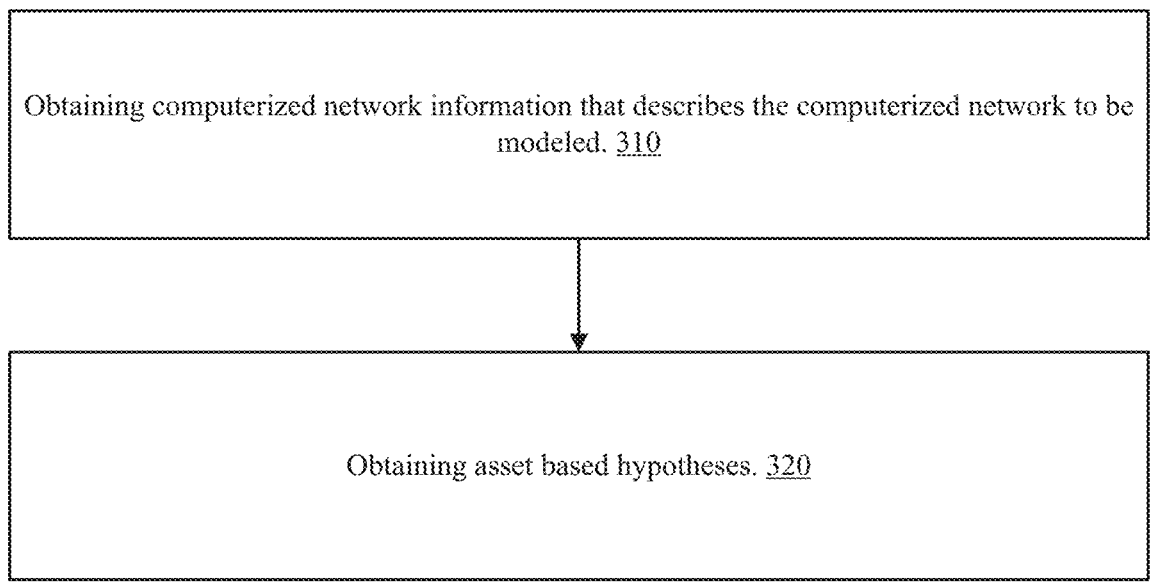
FIG. 3 illustrates an example of a method.

FIG. 3 illustrates method 300 for generating a model of a computerized network.

Method 300 may start by step 310 of obtaining computerized network information that describes the computerized network to be modeled. For example—assets and connectivity information 402.

The computerized network information may include the assets of the computerized network and the connectivity between the computerized network assets.

The computerized network information may also include information about the software and/or firmware and/or hardware of the assets of the computerized network. For example the operating systems hosted by computers of the assets, and the like.

The computerized network information may or may not include information about the actual configuration of each asset—and if such information does not exist—the model can be built using configuration information of other systems.

Method 300 may also include step 320 of obtaining asset based hypotheses. For at least some of the assets of the network—step 320 may include generating the asset based hypotheses.

An asset based hypothesis may describe a pre-requisite for an exposure of the asset, a probability of occurrence of the pre-requisite and a result of the exposure of the asset. The pre-requisite may also be referred to as a pre-condition and the result may be referred to as a post condition.

An asset may be associated with different asset based hypotheses that differ from each other by at least the pre-requisite.

The asset based hypotheses may be generated based on externally available information such one or more sources out of a threat intelligence (e.g. Mitre ATT&CK), compliance information (e.g. DoD STIGs—Department of Defense Security Technical Implementation Guides), vulnerabilities (NVD CVE) combined with organization specific information (discovered or calculated) such as connectivity between assets and attack scenarios.

Steps 310 and 320 may be followed by step 330 of generating, for at least some of the assets of the network, risk assessments building blocks.

The risk assessments building blocks represent (a) risk related dependencies between members of sets of assets of the computerized network, and (b) probabilities of occurrence of the risk related dependencies.

An example of a risk assessment building block is a risk atomic statement. This is a non-limiting example.

The risk assessments building blocks include building blocks related to at least some of the sets of the assets.

An example of an exposure building block relates to a set of assets describes one or more source asset of the set, a target asset of the set, and an exposure probability.

The exposure building block related to the set of assets is calculated based on one or more asset based hypotheses (obtained in step 320).

An exposure probability of an asset is calculated based on an assumption that each one of the one or more source assets of the set is compromised—which is only an example of a calculation of the exposure probability. This assumption is an example of an atomic risk statement.

The risk assessments building blocks may include protection building blocks related to one or more sets of the assets.

A protection building block may be related to a set of assets describes one or more source assets of the set, a target asset of the set, and a protection probability.

The risk assessment building blocks may include both (i) exposure building blocks related to one or more sets of the assets, and (ii) protection building blocks related to one or more sets of the assets.

Figure 4:
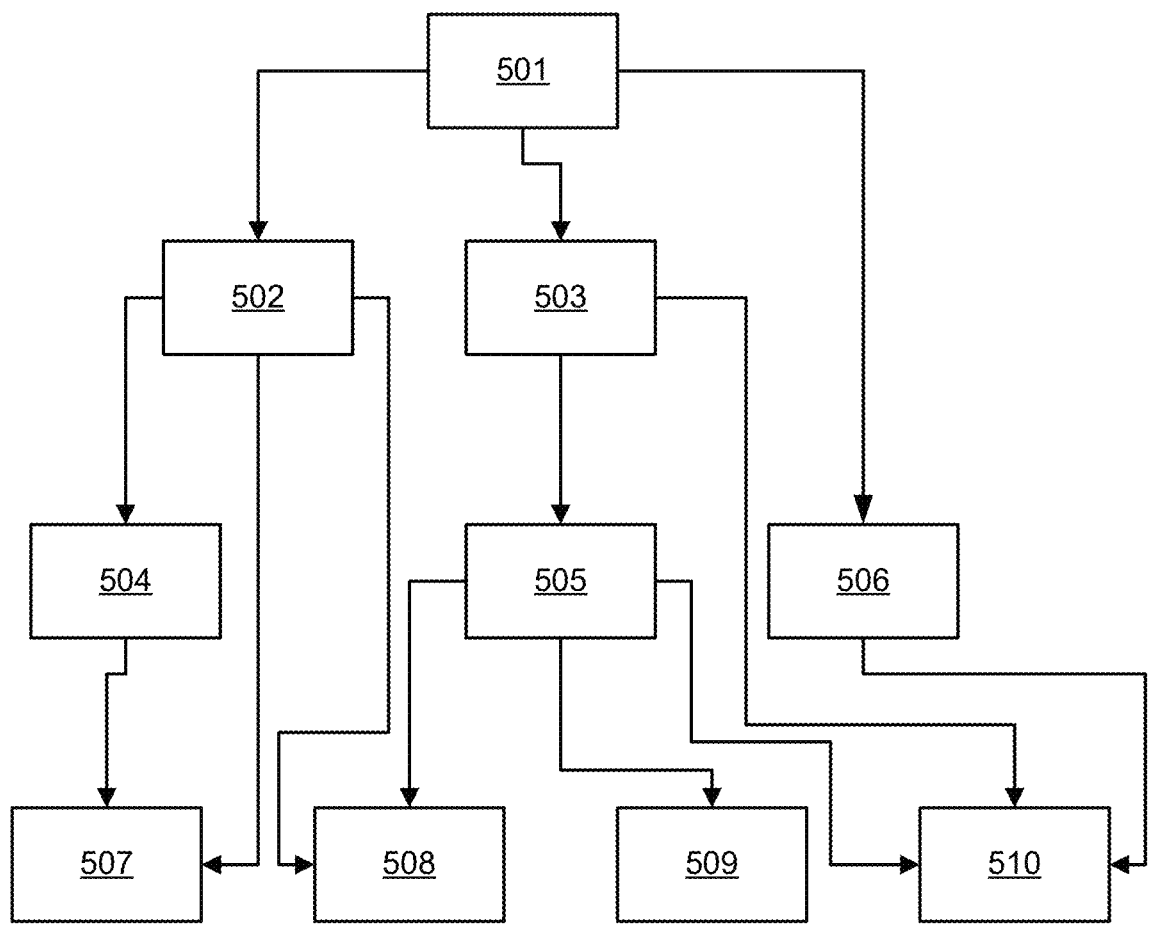
FIG. 4 illustrates an example of a part of a computerized network.

FIG. 4 is an example of a few assets of a computerized network.

The part includes assets 501-510. It is assumed, for simplicity of explanation that lower level assets are connected to higher level assets.

Asset 501 is connected to assets 502, 503 and 506.
Asset 502 is connected to assets 504, 507 and 508.
Asset 503 is connected to assets 505 and 510.
Asset 504 is connected to asset 507.
Asset 505 is connected to assets 508, 509 and 510.
Asset 506 is connected to asset 510.

Lets assume that each asset of 501-510 is associated with one or more asset hypothesis.

Referring to asset 510 as a target asset—an exposure (source assets—503, 505 and 506, target asset 510, exposure probability) may be calculated (especially the exposure probability) based on the exposure probabilities of each one of source assets 503, 505 and 506.

The exposure probability of each one of source asset 503 and 505 is a function of the exposure probability of their source asset 501.

The exposure probability of source asset 505 is a function of the exposure probabilities of his source asset 503.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for model-based risk assessment of a computerized network, the method comprises:
    obtaining a model of the computerized network, the model comprising risk assessments building blocks that represent (a) risk related dependencies between members of sets of assets of the computerized network, and (b) probabilities of occurrence of the risk related dependencies;
    simulating, for at least some of the assets of the computerized network, and based on at least a portion of the model, one or more attacks to provide one or more model-based risk assessment results; wherein the risk assessments building blocks comprise exposure building blocks related to at least some of the sets of the assets; wherein an exposure building block related to a set of assets describes one or more source assets of the set, a target asset of the set, and an exposure probability related to the set of assets; wherein the exposure probability is calculated based on (i) an assumption that each one of the one or more source assets of the set is compromised, and (ii) on protection statements; and
    ranking remediation tasks for remediating computerized network vulnerabilities according to an impact of the remediations tasks on the one or more model-based risk assessment results.

2. The method according to claim 1 wherein the simulating is executed by a cyber twin of the computerized network.

3. The method according to claim 1 wherein the simulating comprises simulation iterations and wherein a subset of the protection statements are randomly selected during each one of the simulation iterations.

4. The method according to claim 3 wherein during the each one of the simulation iterations an exposure statement is said to be applicable when (i) the exposure statement has no protection statement, or when (ii) all its protection statement are fulfilled with compromised protecting assets.

5. The method according to 1 wherein the exposure building block related to the set of assets is calculated based on one or more asset-based hypotheses, wherein an asset-based hypothesis describes a pre-requisite for an exposure of the asset, a probability of occurrence of the pre-requisite and a result of the exposure of the asset.

6. The method according to claim 5 wherein an asset is associated with different asset-based hypotheses that differ from each other by at least the pre-requisite.

7. The method according to claim 1 wherein at least one of the risk assessments building blocks is an atomic statement.

8. The method according to claim 1 wherein the risk assessments building blocks comprise protection building blocks related to one or more sets of the assets.

9. The method according to claim 8 wherein a protection building block related to a set of assets describes one or more source assets of the set, a target asset of the set, and a protection probability related to the set of assets.

10. The method according to claim 1 wherein the risk assessments building blocks comprise exposure building blocks related to one or more sets of the assets and protection building blocks related to one or more sets of the assets, wherein the protection building blocks are associated with the protection statements.

11. The method according to claim 10 wherein the simulating is iterative and comprises multiple simulation rounds.

12. The method according to claim 11 wherein at least some of the simulation rounds comprise estimating which risk assessments building blocks are relevant.

13. The method according to claim 1 wherein the risk assessments building blocks are calculated based on asset-based hypotheses.

14. The method according to claim 13 wherein the asset-based hypotheses are generated based on externally available information that comprises threat intelligence, compliance information, vulnerabilities combined with organization specific information that comprises connectivity between assets and attack scenarios.

15. A non-transitory computer readable medium for model-based risk assessment of a computerized network, the non-transitory computer readable medium stores instructions for:
obtaining a model of the computerized network, the model comprising risk assessments building blocks that represent (a) risk related dependencies between members of sets of assets of the computerized network, and (b) probabilities of occurrence of the risk related dependencies;
simulating, for at least some of the assets of the computerized network, and based on at least a portion of the model, one or more attacks to provide one or more model-based risk assessment results;
wherein the risk assessments building blocks comprise exposure building blocks related to at least some of the sets of the assets; wherein an exposure building block related to a set of assets describes one or more source assets of the set, a target asset of the set, and exposure probability related to the set of assets; wherein the exposure probability is calculated based on an assumption that each one of the one or more source assets of the set is compromised and is also based on one or more protection statements; and
ranking remediation tasks for remediating computerized network vulnerabilities according to an impact of the remediations tasks on the one or more model-based risk assessment results.

16. The non-transitory computer readable medium according to claim 15 wherein the simulating is executed by a cyber twin of the computerized network.

17. The non-transitory computer readable medium according to claim 15 wherein the simulating comprises simulation iterations and wherein a subset of the protection statements are randomly selected during each one of the simulation iterations.

18. The non-transitory computer readable medium according to claim 17 wherein during the each one of the simulation iterations an exposure statement is said to be applicable when (i) the exposure statement has no protection statement, or when (ii) all its protection statement are fulfilled with compromised protecting assets.

19. The non-transitory computer readable medium according to claim 18 wherein the exposure building block related to the set of assets is calculated based on one or more asset-based hypotheses, wherein an asset-based hypothesis describes a pre-requisite for an exposure of the asset, a probability of occurrence of the pre-requisite and a result of the exposure of the asset.

20. The non-transitory computer readable medium according to claim 19 wherein an asset is associated with different asset-based hypotheses that differ from each other by at least the pre-requisite.

21. The non-transitory computer readable medium according to claim 18 wherein at least one of the risk assessments building blocks is an atomic statement.

22. The non-transitory computer readable medium according to claim 15 wherein the risk assessments building blocks comprise protection building blocks related to one or more sets of the assets.

23. The non-transitory computer readable medium according to claim 19 wherein a protection building block related to a set of assets describes one or more source assets of the set, a target asset of the set, and a protection probability related to the set of assets.

24. The non-transitory computer readable medium according to claim 23 wherein the risk assessments building blocks comprise exposure building blocks related to one or more sets of the assets and protection building blocks related to one or more sets of the assets, wherein the protection building blocks are associated with the protection statements.

25. The non-transitory computer readable medium according to claim 24 wherein the simulating is iterative and comprises multiple simulation rounds.

26. The non-transitory computer readable medium according to claim 25 wherein at least some of the simulation rounds comprise estimating which risk assessments building blocks are relevant.

27. The non-transitory computer readable medium according to claim 15 wherein the risk assessments building blocks are calculated based on asset-based hypotheses.

28. The non-transitory computer readable medium according to claim 27 wherein the asset-based hypotheses are generated based on externally available information that comprises threat intelligence, compliance information, vulnerabilities combined with organization specific information that comprises connectivity between assets and attack scenarios.

* * * * *